United States Patent [19]

Komurasaki

[11] Patent Number: 4,840,158
[45] Date of Patent: Jun. 20, 1989

[54] IGNITION TIMING CONTROL APPARATUS FOR AN INTERNAL COMBUSTION ENGINE

[75] Inventor: Satosi Komurasaki, Himeji, Japan

[73] Assignee: Mitsubishi Denki Kabushiki Kaisha, Tokyo, Japan

[21] Appl. No.: 187,463

[22] Filed: Apr. 28, 1988

[30] Foreign Application Priority Data

Apr. 30, 1987 [JP] Japan .................. 62-109329

[51] Int. Cl.⁴ .............................................. F02P 5/14
[52] U.S. Cl. ................................... 123/419; 123/425
[58] Field of Search ............ 123/418, 419, 422, 425, 123/494, 498, 612, 616; 73/35

[56] References Cited

U.S. PATENT DOCUMENTS

| | | | |
|---|---|---|---|
| 4,111,035 | 9/1978 | West et al. ......................... | 73/35 |
| 4,357,918 | 11/1982 | Asano ............................... | 123/425 |
| 4,370,963 | 2/1983 | Komurasaki et al. .............. | 123/425 |
| 4,382,429 | 5/1983 | Enoshima et al. ................. | 123/425 |
| 4,489,692 | 12/1984 | Haraguchi et al. ................ | 123/425 |
| 4,552,111 | 11/1985 | Tahara ............................... | 123/419 |
| 4,607,602 | 8/1986 | Komurasaki ....................... | 123/425 |
| 4,616,617 | 10/1986 | Geiger et al. ...................... | 123/419 |
| 4,694,800 | 9/1987 | Morita ............................... | 123/425 |
| 4,700,677 | 10/1987 | Bontz et al. ....................... | 123/425 |
| 4,710,881 | 12/1987 | Mouri et al. ....................... | 123/425 |
| 4,776,312 | 10/1988 | Yoshioka et al. .................. | 123/419 |

Primary Examiner—Raymond A. Nelli
Attorney, Agent, or Firm—Oblon, Fisher, Spivak, McClelland & Maier

[57] ABSTRACT

An ignition timing control apparatus has an acceleration sensor having a flat detection characteristic in a frequency region of 10 KHz-20 KHz and a frequency filter having its central frequency in the region of 10 KHz-20 KHz.

4 Claims, 10 Drawing Sheets (A)

(B)

(A)

(A)

(B)

(C)

(A)

IGNITION TIMING CONTROL APPARATUS FOR AN INTERNAL COMBUSTION ENGINE

BACKGROUND OF THE INVENTION

1. Field of the Invention

The present invention relates to an ignition timing control apparatus for a internal combustion engine for controlling knocking in the engine.

2. DISCUSSION OF BACKGROUND

FIG. 9 is a block diagram showing a conventional ignition timing control apparatus for an internal combustion engine.

In FIG. 9, a reference numeral 1 designates an acceleration sensor attached to the internal combustion engine to detect a vibration acceleration in the engine, a numeral 2 designates a frequency filter which passes only a frequency signal component having a high sensitivity to the knocking among the output signals of the acceleration sensor 1, and a numeral 3 designates an analog gate for blocking noises which disturb the detection of the knocking signal in the output signals from the frequency filter 2.

The analog gate 3 is opened and closed by instruction from a gate timing controller 4.

An output signal from the frequency filter 2 passed through the analog gate 3 is supplied to a noise level detector 5 and a comparator 6, which also receives the output of the noise level detector 5.

The noise level detector 5 is to detect the level of mechanical vibration noises of the engine except for the knocking signals The comparator 6 compares the output voltage of the analog gate 3 with the output voltage of the noise level detector 5 to produce a knocking detection pulse.

An integrator 7 receives the knocking detection pulse of the comparator 6 to conduct integration processing of it, and produces an integrated voltage depending on the magnitude of the knocking signal. The integrated voltage is supplied to a phase shifter 8, which displaces the phase of a reference ignition signal in response to the output voltage of the integrator 7.

On the other hand, a rotation signal generator 9 generates an ignition signal in accordance with a predetermined ignition advance angle characteristic to supply it to a waveform shaping circuit 10.

The waveform shaping circuit 10 is adapted to shape the ignition signal of the rotation signal generator 9 and at the same time, controls the closing angle in current conduction in an ignition coil 12. A numeral 11 designates a switching circuit for interrupting or continuing the current conduction from the ignition coil 12 in response to the output signal of the phase shifter 8.

FIG. 10 shows frequency characteristic in the output signal from the acceleration sensor 1. In FIG. 10, a curve A designates the characteristic in a case where knocking does not take place, and a curve B designates the characteristic in a case where knocking takes place.

In the output signal of the acceleration sensor 1, there are included a knocking signal, and the other signals signal generated when the knocking takes place, such as mechanical noises of the engine other than the knocking signal, and various noise components carried on a signal transmission line such as ignition noises, and so on.

In comparing the curve A with the curve B in FIG. 10, it is understood that the knocking signal has a peculiar frequency characteristic. Although the distribution in frequency varies depending on engines to be used and the position of the acceleration sensor 1 to be attached to the engine, there is clear difference between the case that the knocking occurs and the case that knocking does not occur. Accordingly, by filtering a frequency component (the band component of the central frequency $f_o$) of the knocking signal, the noises having the other frequency components are suppressed and the knocking signal can be effectively detected.

FIGS. 11 and 12 show operating waveforms for various elements shown in FIG. 9. FIG. 11 concerns mode where there takes place no knocking in the engine, and FIG. 2 concerns mode where there takes place knocking in the engine.

The operations of the ignition timing control apparatus as shown in FIG. 9 will be described.

When the internal combustion engine is actuated, the rotation signal generator 9 generates an ignition signal in response to an ignition timing characteristic which is previously determined. The ignition signal is then subjected to waveform-shaping to be transformed into an opening and closing pulse with a given closing angle by the waveform shaping circuit 10. The shaped ignition signal drives the switching circuit 11 through the phase shifter 8 to thereby turn on and off current-feeding to the ignition coil 12. When the current is interrupted, the engine is fired by an ignition voltage produced in the ignition coil 12. Vibrations in the engine caused in the operations of the engine are detected by the acceleration sensor 1.

When there is no knocking in the engine, the vibrations in the engine resulted by to the knocking do not occur. However, the mechanical noises and the ignition noises are carried on the signal transmission line at the time of ignition F, and they are contained in the output signal of the acceleration sensor 1 as shown in FIG. 11a. When the output signal is passed through the frequency filter 2, the mechanical noise components are fairly suppressed as shown in FIG. 11b. However, the output signal having a large ignition noise component is sometimes outputted even after being passed through the frequency filter 2 since the magnitude of the ignition noise component is large. In this case, the ignition noises are recognized as knocking signals. Therefore, the analog gate 3 is used to interrupt the ignition noises by closing its gate in a period from the ignition by the output of the gate timing controller 4 which is triggered by the output of the phase shifter 8 (FIG. 11c). As a result, only mechanical noises having a low level as indicated by A in FIG. 11d are remained in the output of the analog gate 3.

On the other hand, the noise level detector 5 responds to change of the peak value of the output signal of the analog gate 3. In this case, the noise level detector 5 has the characteristics capable of responding to a relatively slow change in the peak value of mechanical noises and generates a d.c. voltage slightly higher than the peak value of the mechanical noises (as indicated by B in FIG. 11d).

Accordingly, since the output of the noise level detector 5 is greater than the average peak value of the output signal from the analog gate 3 as shown in FIG. 11d, no output signal is produced from the comparator 6 for comparing both signals as shown in FIG. 11e, with the result that the noise signal is completely removed. Accordingly, since there is no output voltage from the integrator 7 as shown in FIG. 11f, phase angle (reference in phase between the input and output signals in FIG. 11g and h) given by the phase shifter 8 is also 0. Accordingly, the phase of opening and closing the switching circuit driven by the output signal of the phase shifter 8, i.e. the phase of the current intermittently produced in the ignition coil 12 is the same as the phase of the reference ignition signal as the output from the waveform shaping circuit 10, whereby the ignition timing corresponds to the reference ignition timing.

When the knocking takes place, the output of the acceleration sensor 1 contains the knocking signal with a certain time delay from the ignition timing as shown in FIG. 12a, and the signal after being passed through the frequency filter 2 and the analog gate 3 is such that the knocking signal is overlapped with tee mechanical noises as indicated by A in FIG. 2d. Of the signal passed through the analog gate 3, since the rising part of the knocking signal is steep, response for the output voltage of the noise level detector 5 is delayed with respect the knocking signal. As a result, the input signals to the comparator 6 respectively take the form as shown by A and B in FIG. 12d, whereby pulses are produced in the output of the comparator 6 as shown in FIG. 12e.

The integrator 7 integrates the pluses to thereby produce an integrated voltage as shown in FIG. 12f. Since the phase shifter 8 displaces the output signal (the reference ignition signal as by FIG. 12b) of the waveform shaping circuit 10 to the side of delay in tim in response to the output voltage of the integrator 7, the phase of the output signal of the phase shifter 8 is lagged with respect to the phase of the reference ignition signal of the waveform shaping circuit 10. With such lag in phase of the output of the phase shifter 8, the switching circuit 11 is actuated to have the phase as shown in FIG. 12h. Accordingly, there causes delay in ignition time to result a state that the knocking is suppressed. Thus, the optimum ignition timing controlling is carried out by keeping the state as shown in FIGS. 11 and 12.

Heretofore, there was clear difference in distribution of the output signal from the acceleration sensor 1 depending on the presence or absence of the knocking at a frequency band lower than 10 KHz. Accordingly, the central frequency ($f_o$ of the frequency filter 10 as shown in FIG. 10 had been determined to have 6 KHz–9 KHz.

However, in the conventional ignition timing control apparatus, there was a problem such that mechanical noises of the engine or noises due to abnormal combustion other than the knocking appeared in the range of 6 KHz–10 KHz owing to the characteristic of an engine to be used so that these noises overlap the detected knocking signal, by which it was difficult to obtain a knocking signal having a clear difference of voltage with respect to these noise signals through the output of the frequency filter 2.

FIG. 13 shows an example of data obtained by analyzing the detection signal of the acceleration sensor 1 by using a frequency analyizer.

FIG. 13A shows a case that there is no knocking in the engine, and FIG. 13B shows a case that there is knocking in the engine. In FIG. 13A, there is found distinct level of noises in FIG. 13A, and FIG. 13B shows the noises in a low level.

It is found in FIG. 13A that the distribution of the noises is within 5.5 KHz–8.5 KHz, and there is no noises in the region of 10 KHz or higher. On the other hand, in FIG. 13B, knocking signals are within the regions of 6 KHz–8 KHz, 11 KHz–13 KHz and 15 KHz–17 KHz where the above-mentioned noises are present. Namely, since the knocking signals and the noises are present in the same frequency bands in the region lower than 10 KHz, it is not suitable to detect the knocking signal. However, in the region higher than 10 KHz, there appears no noise and only the knocking signals appear, and accordingly, this region is suitable to be used for detecting the knocking signal since difference between the presence of the knocking signals and the absence of the same is distinguished.

The conventional acceleration sensor is fundamentally difficult in assuring its characteristics to detect accurately the knocking signals appearing in the region of 10 KHz or higher or it is difficult to be manufactured.

FIG. 14A is a front view of a resonance type acceleration sensor 20 with a screw portion formed by a meter screw (hereinbelow, referred to as an M screw or an metric screw) which is used to attached the sensor 20 to the engine. By fastening the meter screw portion 21 with the corresponding a female M screw formed in the engine, the fastening seat surface portion 22 of the sensor 20 is in close-contact with the surface of the engine.

FIG. 15 shows the characteristics of the acceleration sensor 20. FIG. 15A is a diagram showing a relation of exciting frequency to output signal, FIG. 15B is a diagram showing a relation of exciting force to resonance frequency $f_r$, and FIG. 15c is a diagram showing a relation of exciting force to frequency band width $f_{BW}$.

FIG. 15A shows a voltage produced from the acceleration sensor 20 when an exciting frequency is changed under the condition of the acceleration being constant. In FIG. 15A, the maximum frequency is referred to as the resonance frequency $f_r$, and the width of the frequency region at the voltage level 3 dB lower than the voltage of the resonance frequency fr is referred to as a band with $f_{BW}$.

In the resonance type acceleration sensor 20, the piezo-electric element is formed, for instance in a cantilever form, and accordingly, it is difficult to adjust the resonance frequency $f_r$, especially, there was a problem that it was necessary to further precise adjustment of the resonance frequency and the sensor 20 should have a accurate construction in the region higher than 10 KHz. For instance, the size of the structural elements must be small, whereby machining and treatment of these elements become difficult. The number of steps of work is increased in order to meet the resonance frequency since the frequency of the knocking signal is variable depending on engines to be used.

Since the band width $f_{BW}$ is narrow, $Q=f_r/f_{BW}$ is high. Accordingly, it responds excessively to the knocking signal, and the knocking signal can not accurately be detected. Particularly, there was a great influence when the engine is driven at a high speed, and reduction in controlling ability could not be neglected.

When observation was made by using an actural apparatus, it was found that Q should be about 10 or lower. However, in the conventional resonance type sensor, Q was 15 or higher.

FIG. 14B is a diagram of the cantilever type piezo-electric element, and FIG. 14C is a diagram showing the principle of the operation of the element. In FIG. 14B, a fixing base 23 supports an end of a vibration detecting element 24 of a cantilever type which is constituted by a piezo-electric element. The vibration detecting element 24 is formed by bonding two piezo-electric elements having polarization in the direction of thickness (a simbol l designates the direction of length) so that the pezo-electric elements are mutually in contact with the same polarity and one end of the bonded element is fixed to be in a cantilever structure (FIG. 14C).

As shown in FIG. 14C, when the fixing base 23 is caused to be vibrated downwardly, the vibrator is deflected upwardly, whereby the upper piezo-electric element 24 is compressed to produce a negative electric charge, and on the hand, the lower piezo-electric element 24 is pulled to produce a positive electric charge.

When the fixing base 23 is oscillated upwardly in FIG. 14C, the two piezo-electric elements 24 undergo a pulling force and a compressing force as contrary to the above-mentioned case, whereby the electric charges are produced in the different elements.

In accordance with the above-mentioned principle, the piezo-electric element 24 are caused resonance at the frequency $f_r$, whereby they respond to the oscillation of the resonance frequency $f_r$ to thereby produce the electric charges.

FIG. 15B is a graphical representation in which the resonance frequency $f_r$ changes under the condition that the exciting frequency is constant and only acceleration speed is changed. The FIG. 15B shows that the resonance frequency $f_r$ is changed by changing the acceleration speed. It gives influence to detect the knocking signal.

FIG. 15C is a graphical representation in which the band width $f_{BW}$ is changed when the resonance frequency is constant and only the acceleration is changed. The FIG. 15c shows that the band width is changed by changing the acceleration speed. It gives influence to detect the knocking signal.

FIG. 16 shows a non-resonance type acceleration sensor 25 with a tapered screw portion which is used to attach it to the engine. The non-resonance type acceleration sensor 25 is attached to the engine by fastening the tapered screw portion 26 to a corresponding female screw portion formed in the engine so that the tapered screw portion 26 is entered in the female screw portion from the free end of it to the line indicated by a reference numeral 27. In other words, there is a small gap between the shoulder portion of the main body of the sensor 25 and the surface of the engine. The above-mentioned acceleration sensor 25 is disclosed in, for instance, Japanese Unexamined Utility Model Publication No. 13673/1983.

FIG. 17 shows the characteristic of the acceleration sensor 25, wherein the abscissa represents exciting frequency and the ordinate represents the magnitude of output signal. In FIG. 17, as the frequency increases, the magnitude of an output signal becomes large although the non-resonance type sensor shows no change of output signal with respect to the exciting frequency. In such acceleration sensor, there is a limitation at about 10 KHz. When the frequency is 10 KHz or higher, it can not be practically used. The reason is that the higher the frequency is, the stronger the resonance characteristic is, because the acceleration sensor 25 is fixed to the engine in a state that it is fastened at the fastening position 27 and there is a space gas between the shoulder of main body of the sensor 25 and the surface of the engine.

SUMMARY OF THE INVENTION

It is an object of the present invention to provide an ignition timing control apparatus for an internal combustion engine capable of detecting faithfully knocking signals having a frequency of 10 KHz or higher to thereby control the knocking of the engine.

The foregoing and the other objects of the present invention have been attained by providing an ignition timing control apparatus for an internal combustion engine which comprises:

a non-resonance type acceleration sensor which has a piezo-electric element as a vibration detecting element for the engine and a metric screw portion to be engaged with the same;

a frequency filter having its central frequency in a range of from 10 KHz to 20 KHz and its band width of 1 KHz or higher which selectively detects a knocking signal component contained in an output from the sensor;

a gate means for interrupting a noise which disturbs detection of the knocking signal contained in an output signal from the frequency filter;

a noise level detector for detecting, from an output from the gate means, the level of a mechanical vibration noise of the engine other than the knocking signal;

a comparing and integrating means for integrating a pulse obtained by comparing an output voltage from the noise level detector with an output voltage from the gate means;

a rotation signal generator for generating an ignition signal in response to a predetermined ignition advance angle characteristic;

a waveform-shaping circuit for shaping the waveform of the output of the rotation signal generator and for controlling the closing angle of an ignition coil;

a phase shifter for shifting with delay of time the output signal of the waveform-shaping circuit in response to the output of the comparing and integrating means so that a switching circuit for turning-on and off the ignition coil is actuated; and a gate timing controller triggered by the output of the phase shifter so as to interrupt the ignition noise by closing the gate of the gate means for a predetermined time from the time of ignition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
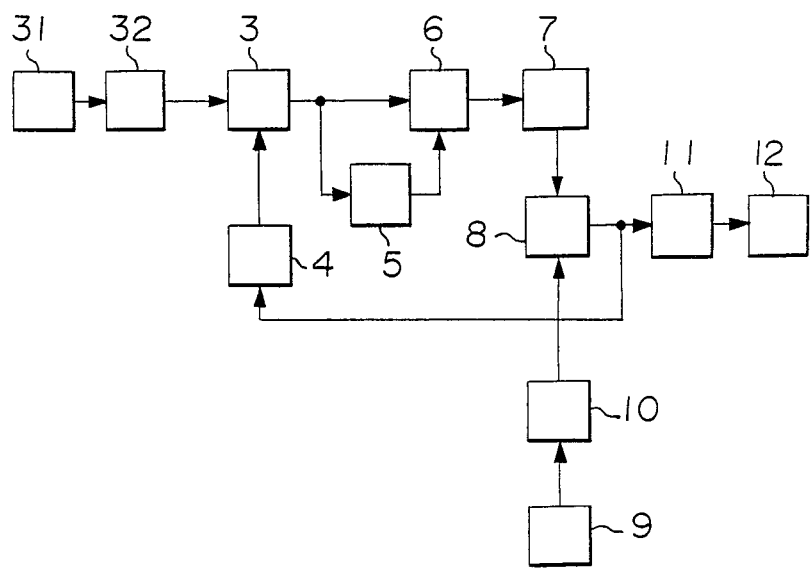
FIG. 1 is a block diagram of an embodiment of the ignition timing control apparatus for an internal combustion engine according to the present invention.

Referring to the drawings, wherein the same reference numerals designate the same or corresponding parts throughout the several views, and more particularly to FIG. 1 thereof, there is shown a block diagram showing an example of the ignition timing control apparatus for an internal combustion engine of the present invention.

In FIG. 1, a reference numeral 31 designates an acceleration sensor of a non-resonance type (which has characteristic to render an output voltage to be flat with respect to frequency) and it has a fitting screw formed by an M screw. The acceleration sensor 31 is of a type to perform a sufficient function at a high frequency region of 10 KHz–20 KHz.

A numeral 32 designates a band-pass type frequency filter which is so-called active filter and its circuit is formed by, for instance, an operational amplifier, a resistor and capacitor.

Figure 2:
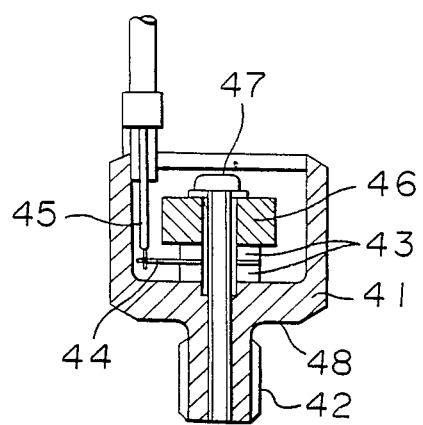
FIG. 2 is a cross-sectional view of an embodiment of the acceleration sensor used for the embodiment shown in FIG. 1.

FIG. 2 shows in detail the construction of the acceleration sensor 31. The acceleration sensor 31 comprises a housing 41 to receive elements which constitute the sensor, a screw portion 42 formed by the M screw to be fastened to the engine, a fastening seat portion 48 formed in the shoulder portion of the housing 41 and two annular-shaped piezo-electric elements which are to convert vibrations into a voltage signal.

An electrode 44 is inserted between the two piezo-electric elements 43 to take out a voltage signal produced in the piezo-electric elements 43, whereby the voltage signal is transmitted to the outside of the sensor through a lead wire 45.

A weight 46 is provided in the housing to apply a force of inertia to the piezo-electric elements. The weight 46, the piezo-electric elements 43 and the electrode 44 are fixed to the housing 41 by means of a screw 47. The housing 41 attached to the engine by the screw portion 42 is oscillated in response to vibrations given to the fixed part. In this case, the force of inertia by the weight 46 is applied to the piezo-electric elements 43, whereby a voltage is produced in the elements 43 depending on the magnitude of the inertia. The voltage is taken out outside the sensor through the electroad 44 and the lead wire 45.

Figure 3:
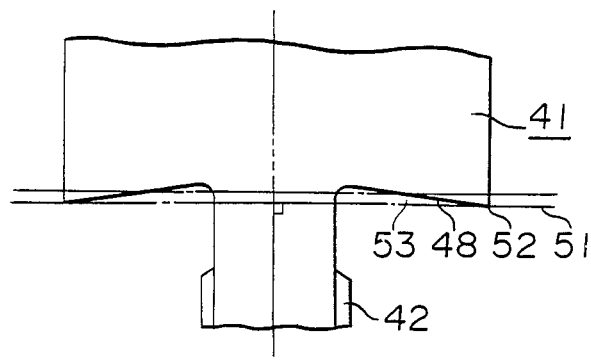
FIG. 3 is a schematic view of the shape of fastening seat portion of the acceleration sensor which is to be fixed to the engine.

In the non-resonance type acceleration sensor 31 in this embodiment, it is important to form the fastening seat portion 48 of the housing 41 as shown in FIG. 3 in order to make the detection characteristic of the sensor 31 to be flat even at a high frequency region of 10 KHz–20 KHz.

In FIG. 3, a reference numeral 51 designates a reference line which intersects at a right angle with the center line of the screw portion 42 of the housing 41, and a numeral 52 designates the crossing point of the reference line 51 and the outermost circular edge of the fastening seat portion 48 of the housing 41.

Thus, by providing the fastening seat portion 48, the fastening seat portion of the acceleration sensor 31 facing the engine corresponds to the reference line 51.

Accordingly, when the acceleration sensor 31 is fastened to the engine by means of the screw portion 42, the seat portion 48 of the acceleration sensor 31 which is in contact with the fastening seat portion of the engine is given by the crossing point 52 at the outermost circular edge.

When the corresponding fastening seat portion on the engine is smaller than the fastening sea portion 48 of the acceleration sensor 31, the corresponding seat portion of the engine is in contact the seat portion 48 at the point 53 which is inside the outermost circular edge of the fastening seat portion 48. In this case, the same effect is obtainable.

Thus, by forming the fastening seat portion 48 in a tapered form, namely, the outer circular edge approaches the screw portion 42, the detection characteristic of the acceleration sensor 31 is flat even in the range of 10 KHz–20 KHz.

Figure 4:
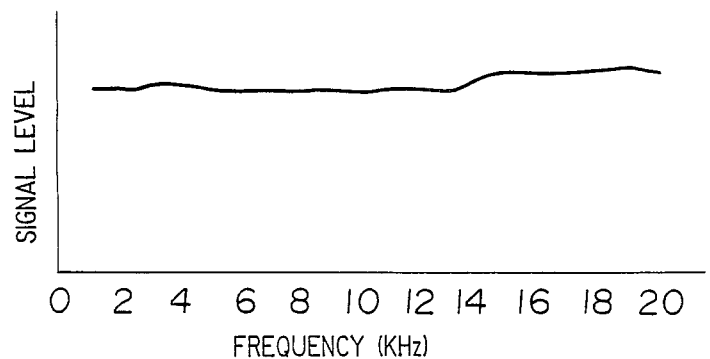
FIG. 4 is a diagram showing an example of data in a relation between the frequency and signal level in a detection characteristic of the acceleration sensor.

In FIG. 4, showing measured data the abssissa indicates frequency and the ordinate indicates output voltage. As shown in FIG. 4, there is obtainable a flat frequency characteristic even in the range of 10 KHz–20 KHz.

When the fastening seat portion 48 is brought into contact with the corresponding fastening seat portion of the engine at the position corresponding to the outer diameter of the screw portion 42, the flat frequency characteristic as shown in FIG. 4 can not be obtained.

Figure 5:
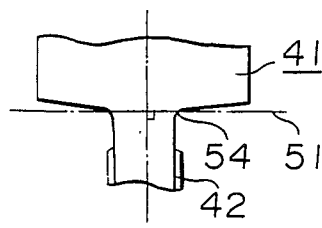
FIGS. 5A and 5B are respectively diagrams showing the fastening seat portion of the acceleration sensor according to different embodiments.
Figure 5:
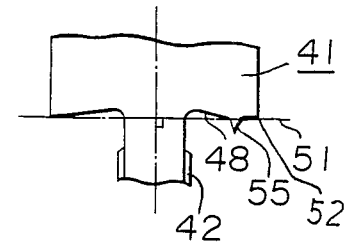

FIG. 5A shows the shape of the fastening seat portion 48 in which the reference line 51 intersects at the point 54 which corresponds to the diameter of the screw portion 42.

FIG. 5B shows that a projection 55 is formed on the fastening seat portion 48 at a position outside the diameter of the screw portion 42, but inside the outermost circular edge of the seat portion 48.

In this case, a flat frequency characteristic as shown in FIG. 4 can not been obtained.

The characteristic of the frequency filter 42 will be described. The frequency filter 32 is a band-pass filter which has the central frequency of which may be determined to be in a frequency region 10 KHz–20 KHz in consideration of the frequency of an expected knocking signal.

Figure 6:
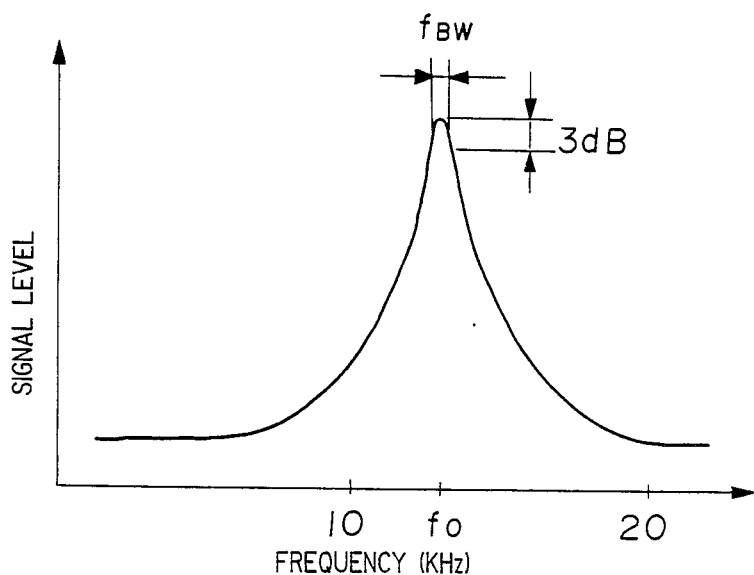
FIG. 6 is a frequency characteristic diagram of a frequency filter used for the ignition timing control apparatus according to the present invention.

FIG. 6 shows the characteristic of the frequency filter. The central frequency $f_o$ is determined in a range of 11 KHz–13 KHz or 15 KHz–17 KHz for the engine as shown in FIG. 13B.

In this case, the band width $f_{BW}$ (i.e. the width of frequencies to provide an output voltage which is 3 dB lower than the output voltage at the central frequency $f_o$) is an important factor and the width is preferable to be 1 KHz or higher.

Figure 7:
FIGS. 7A and 7B are respectively diagrams showing the waveform of outputs from the frequency filter.
Figure 7:
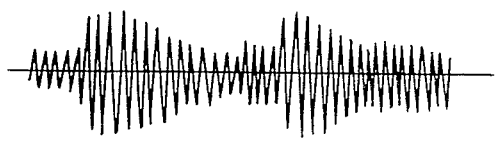
Figure 14:
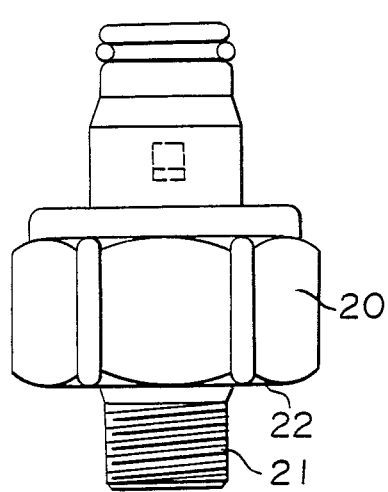
FIG. 14A is a front view of an acceleration sensor for the conventional apparatus, the sensor being provided with a meter screw portion to be engated with the engine.
FIG. 14B is a perspective view of the piezo-electric elements formed in a cantilever structure to constitute the acceleration sensor for the conventional apparatus.
FIG. 14C is a diagram showing the principle of operation of the piezo-electric elements.
Figure 14:
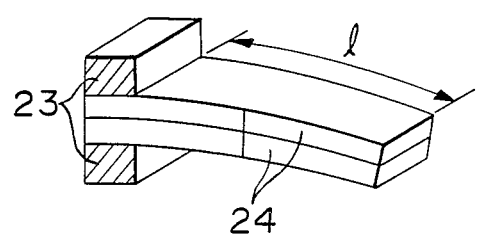
Figure 14:
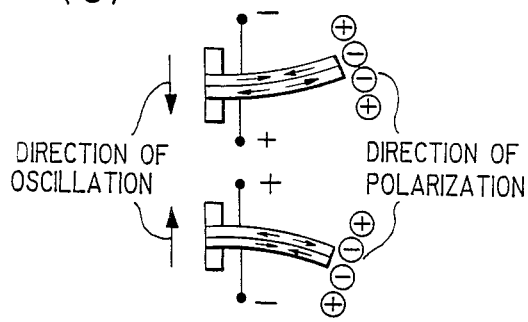
Figure 15:
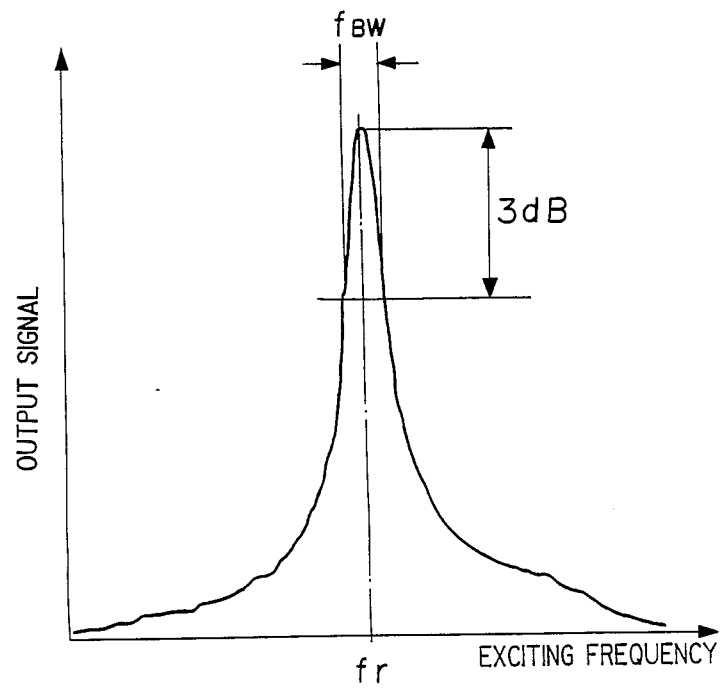
FIG. 15A is a diagram showing the frequency characteristic of the acceleration sensor as shown in FIG. 14A.
FIG. 15B is a diagram showing a relation between an acceleration speed of the acceleration sensor and resonance frequency.
FIG. 15C is a diagram showing the variation of band width to an acceleration speed of the acceleration sensor.
Figure 15:
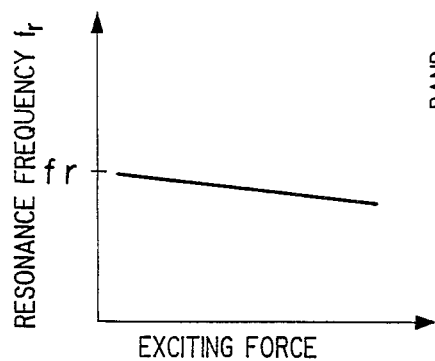
Figure 15:
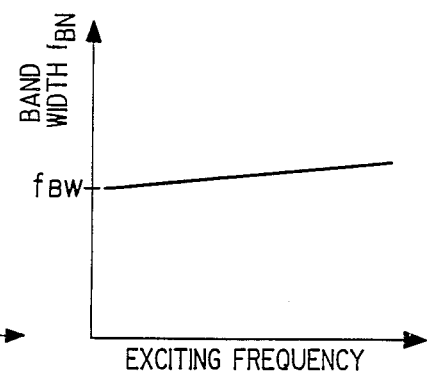
Figure 16:
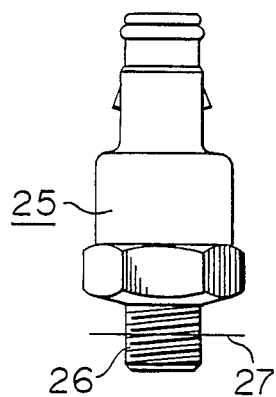
FIG. 16 is a front view of another acceleration sensor having a tapered screw portion which is to be fastened to the engine used for the conventional apparatus.
Figure 17:
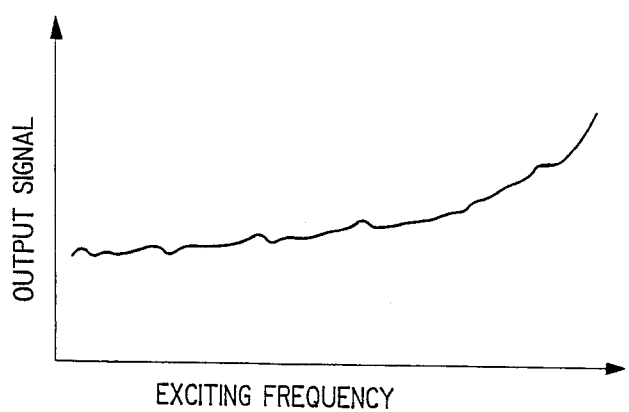
FIG 17 is a diagram showing the frequency characteristic of the acceleration sensor shown in FIG. 16.

If $Q(=f_o/f_{BW})$ is too large, the output voltage can not correctly follow the acceleration of the engine as described with reference to the resonance type sensor in FIG. 14. For instance, when the acceleration signal of the engine assumes a form as shown in FIG. 7A, the output signal of the frequency filter 32 which receives the acceleration speed assumes the form as shown in FIG. 7B in which the level of acceleration is prolonged along the time axis. Accordingly, it can not correctly follow the original signal, the knocking signal can not be correctly detected.

Figure 13:
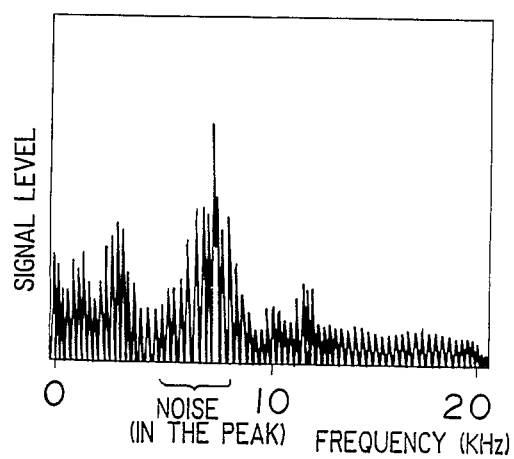
FIG. 13A is a diagram showing data of the detection signal of the acceleration sensor in the conventional apparatus which is analized by using a frequency analyzer when there is no knocking in the engine.
FIG. 13B is a diagram showing data of the detection signal of the acceleration sensor in the conventional apparatus which is analized by using the frequency analyzer when there is knocking in the engine.
Figure 13:
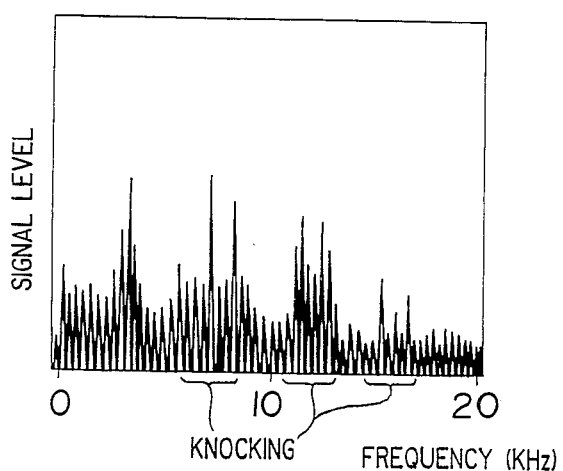

As shown in FIGS. 13A and 13B, since the noises in the high frequency region of 10 KHz or higher are smaller than those in the region of 10 KHz or lower, the knocking signal components can be much detected by broadening the band width $f_{BW}$ to the extent of 11 KHz–17 KHz. This measures is preferable in design in addition to determination of Q to be low.

When the active filter is used for the frequency filter 32 constituted by the operational amplifier, the resistor and the capacitor, practically important factors are the gain and the through-rate of the operational amplifier in the frequency region of 10 KHz–20 KHz and tan δ of the capacitor. However, the characteristics of the operational amplifier can be more or less compensated by using a PPS film capacitor which has excellent characteristic in tan δ and small electrostatic capacity as well as heat resistance property.

The active filter having the above-mentioned construction provides a reliable operation since it assures a stable characteristic even in bad condition such as in the engine room of an automobile.

Also, the PPS film capacitor is far superior in its characteristics to conventionally used polyester film capacitor or a polypropylene film capacitor.

Figure 8:
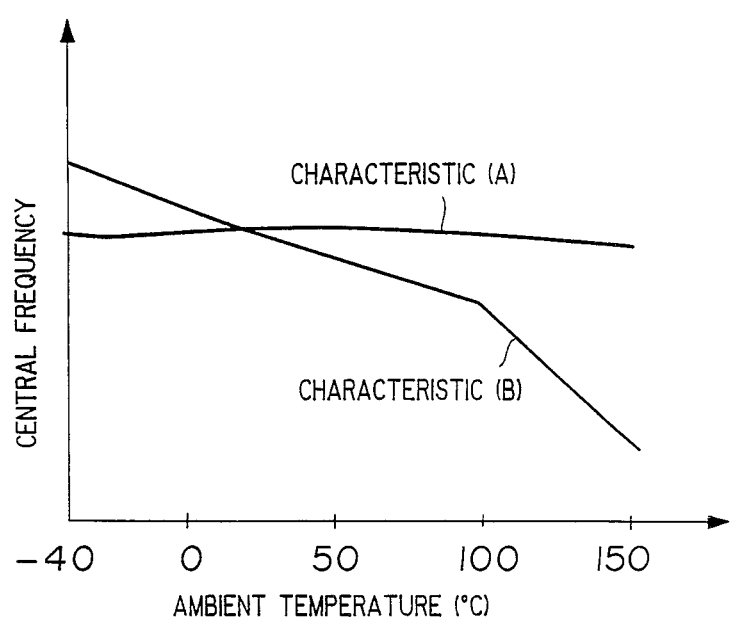
FIG. 8 is a diagram showing the temperature characteristic of the frequency filter.
Figure 9:
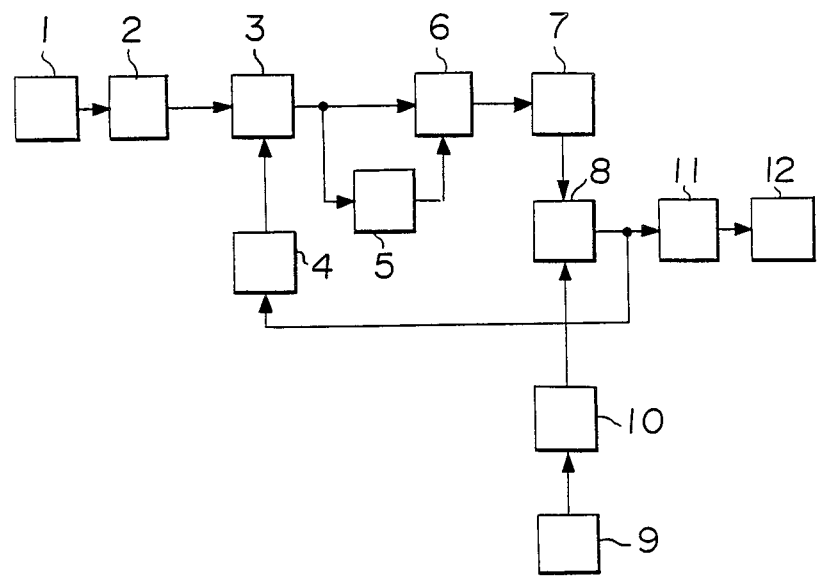
FIG. 9 is a block diagram of a conventional ignition timing control apparatus for an internal combustion engine.
Figure 10:
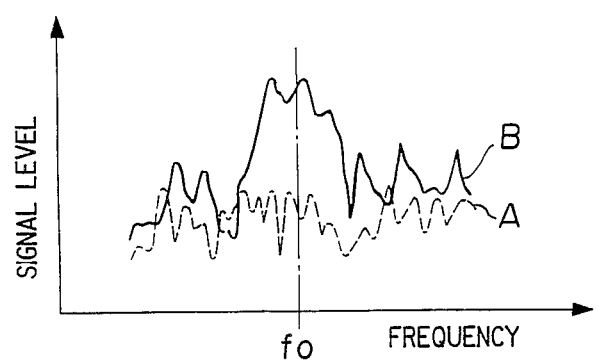
FIG. 10 is a diagram showing the frequency characteristic of an output signal from a conventional acceleration sensor.

FIG. 8 is a diagram showing the characteristic (a curve A) of the frequency filter employing the PPS film capacitor and the characteristic (a curve B) of a filter employing a polyester film capacitor. As shown in FIG. 8, change of characteristic (a curve B) due to temperature is large when the conventional polyester film capacitor is used, which may cause adverse effect to defect the knocking signal. On the other hand, the characteristic (a curve A) obtained by using the PPS film capacitor is stable. For instance, change of characteristic (a curve A) is 1% or lower at 100° C. and 2% or lower at 150° C. when a reference temperature of 25° C. is taken. On the other hand, change of the characteristic (a curve B) is 7% for lower at 100° C. and 19% for lower at 150° C.

From the viewpoint of heat-resistance property, polypropylene film is better than the polyester film. However, as is wellknown, a polypropylene film capacitor can not be used since it is broken down at 100° C. or higher.

Thus, by forming a filter circuit by using the PPS film capacitor, there is obtainable excellent temperature characteristic of central frequency. Further, flexibility in design of the band width $f_{BW}$ can be increased, and there is easily obtainable a band width $f_{BW}$ narrower than that of the polyester film capacitor. In order to obtain a broad band width by using the polyester film capacitor, it is necessary to compensate by the characteristic of the operational amplifier. However, design of the polyester film capacitor is difficult.

In the above-mentioned embodiment of the present invention, the knocking signal in the frequency regions of 11 KHz–13 KHz and 15 KHz–17 KHz as shown in FIG. 13B can be correctly detected by the acceleration sensor 31 having flat characteristic even in the high frequency range of 10 KHz–20 KHz.

The frequency filter 32 selectively outputs the band components of 11 KHz–13 KHz, 15 KHz–17 KHz or 11 KHz–17 KHz from the detected output of the acceleration sensor 31. Accordingly, a signal which easily detects the knocking signal having a large signal level depending on the presence or absence of the knocking as shown in FIGS. 11d and 12d, can be obtained.

In the resonance type sensor as shown in FIG. 14A, it is necessary to adjust the resonance frequency for an engine to be used since engines have their own knocking signal frequency. Although there is a problem that it is difficult to manufacture the sensor for a high frequency of 10 KHz or higher, determination of the central frequency $f_o$ to be 10 KHz or lower can be allowed by using the frequency filter 32. In manufacturing, there is no problem of its having the central frequency of 10 KHz or higher.

Since the band width $f_{BW}$ can not be froaden in the resonance type sensor as shown in FIG. 14A, there is a problem that the knocking signal can not be effectively detected in the frequency range of 10 KHz or higher where occurrence of noises is small and the knocking signals scatter in a wide range. However, the above-mentioned frequency filter 32 allowed easy determination.

Figure 11:
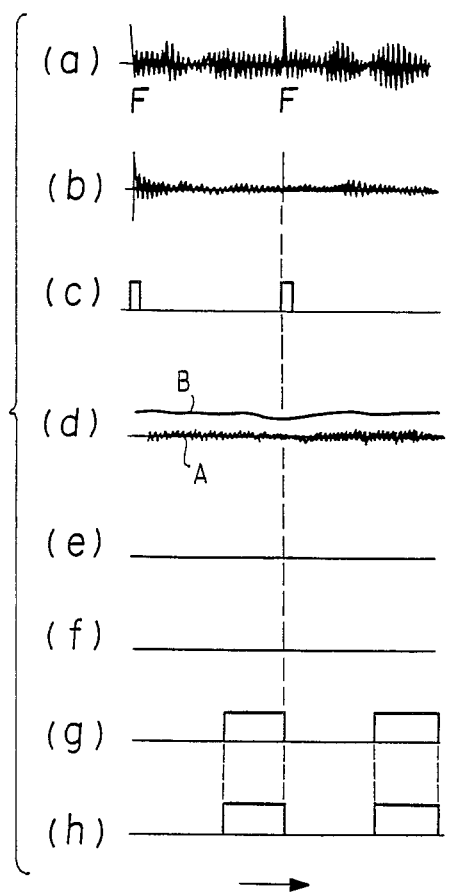
FIGS. 11a through 11h are diagrams showing operating waveforms for the elements in the conventional apparatus when there is no knocking in the engine.
Figure 12:
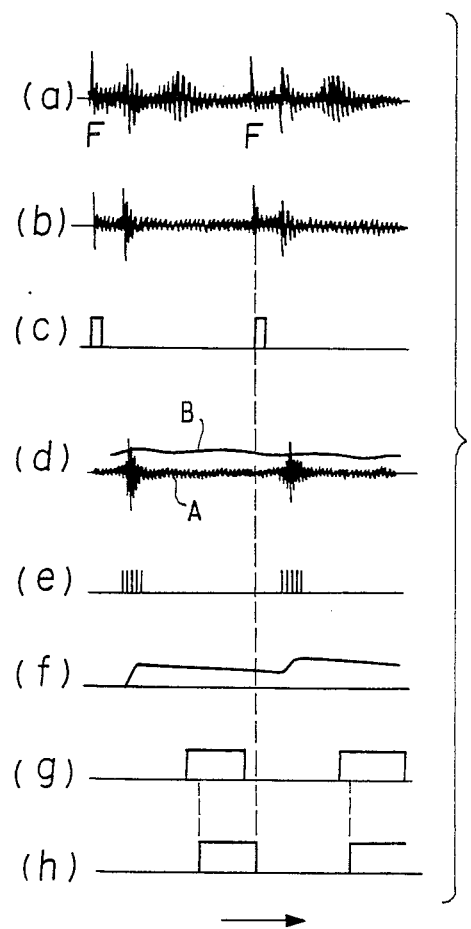
FIGS. 12a through 12h are diagrams showing operating waveforms of the elements in the conventional apparatus when there is knocking in the engine.

Since two kinds of input signals as shown in FIGS. 11d and 12d are received in the comparator 6, the knocking signal can be correctly detected.

In accordance with the present invention, the acceleration sensor of non-resonance type having a flat detection characteristic in a high frequency region of 10 KHz–20 KHz is attached to the engine by means of the M screw portion formed in the sensor, and the knocking signal of the engine detected by the acceleration sensor is treated by the band-pass filter type frequency filter so as to select frequency components of 10 KHz–20 KHz. Accordingly, a detection signal having a large difference of signal level can be obtained in response to the knocking of the engine while neglecting signals in the frequency range of 10 KHz or lower which are difficult to discriminate the knocking signal, whereby the knocking of the engine can be correctly and easily detected to thereby provide a suitable ignition timing control.

Obviously, numerous modifications and variations of the present invention are possible in light of the above teachings. It is therefore to be understood that within the scope of the appended claims, the invention may be practiced otherwise than as specifically described herein.

What is claimed is:

1. An ignition timing control apparatus for an internal combustion engine which comprises:
   a non-resonance type acceleration sensor which has a piezo-electric element as a vibration detecting element for said engine and a metric screw portion to be engaged with the same;
   a frequency filter having its central frequency in a range of from 10 KHz to 20 KHz and its band width of 1 KHz or higher, which selectively detects a knocking signal component contained in an output from said sensor;
   a gate means for interrupting a noise which disturbs detection of the knocking signal contained in an output signal from said frequency filter;
   a noise level detector for detecting, from an output from said gate means, the level of a mechanical vibration noise of the engine other than the knocking signal;
   a comparing and integrating means for integrating a pulse signal obtained by comparing an output voltage from said noise level detector with an output voltage from said gate means;
   a rotation signal generator for generating an ignition signal in response to a predetermined ignition advance angle characteristic;
   a waveform-shaping circuit for shaping the waveform of the output of said rotation signal generator and for controlling the closing angle of an ignition coil;
   a phase shifter for shifting with delay of time the output signal of said waveform-shaping circuit in response to the output of said comparing and integrating means so that a switching circuit for turning-on and off said ignition coil is actuated; and
   a gate timing controller triggered by the output of said phase shifter so as to interrupt the ignition noise by closing the gate of said gate means for a predetermined time from the time of ignition.

2. The ignition timing control apparatus according to claim 1, wherein said acceleration sensor has a housing in which a tapered fastening seat portion is formed at the shoulder portion contiguous to said metric screw portion.

3. The ignition timing control apparatus according to claim 2, wherein the outermost circular edge of said tapered fastening seat portion constitutes a contacting area to the surface of said engine.

4. The ignition timing control apparatus according to claim 1, wherein said frequency filter comprises a PPS film capacitor.

* * * * *